UNITED STATES PATENT OFFICE.

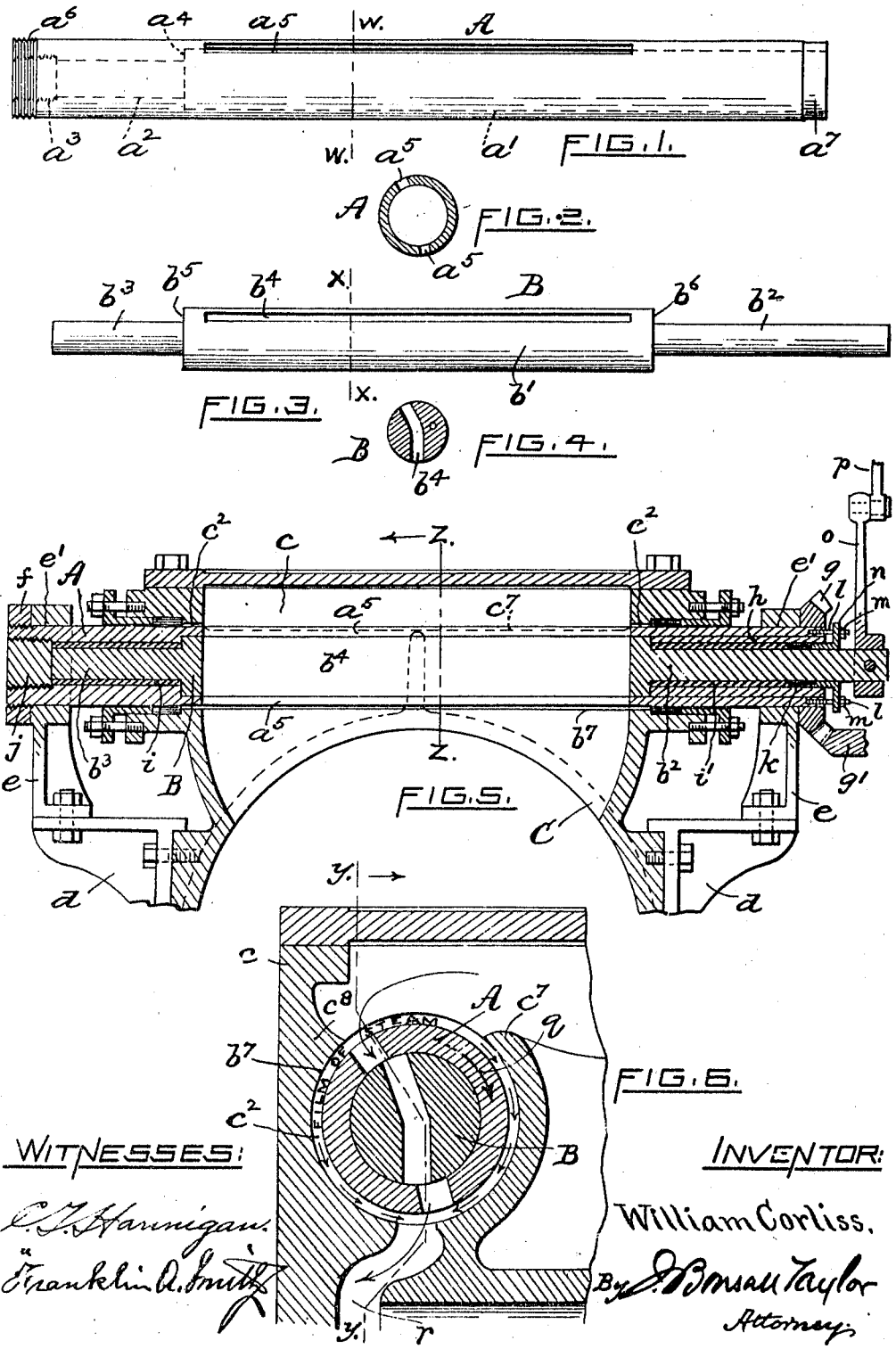

WILLIAM CORLISS, OF PROVIDENCE, RHODE ISLAND.

VALVE.

970,469.   Specification of Letters Patent.   Patented Sept. 20, 1910.

Application filed April 3, 1909. Serial No. 487,816.

*To all whom it may concern:*

Be it known that I, WILLIAM CORLISS, a citizen of the United States, residing at Providence, in the county of Providence and State of Rhode Island, have invented a new and useful Valve Designed to Control the Delivery and Discharge of Steam or other Motive Force To and From a Cylinder, of which the following is a specification.

The object of this invention is to simplify the mechanism by which steam is admitted to and discharged from an engine cylinder, to reduce the cost of engine construction, to eliminate complicated valve gearing, to do away with the reciprocating parts thereof, and at the same time to insure perfect regulation by measuring out at each stroke the amount of steam necessary to maintain uniformity of speed.

Further objects are to lessen friction of the engine, to reduce the cost of maintenance, and to provide a system of valves that will work satisfactorily at any speed at which the engine may be required to run.

I accomplish these results through the medium of what I term an arbor valve, a structure peculiar both in design and operation. The structure is not a valve in the ordinary sense of the term, for it has no seat, and, in its normal condition, is never in actual contact with the surrounding metal, yet it perfectly controls the flow of steam, or other propelling force. To be more definite: Imagine a plain cylindrical arbor, set in bearings located on each side of the cylinder, entirely outside of the steam chest, but in perfect concentric alinement with a cylindrical opening in the steam chest;—make this arbor just sufficiently smaller in diameter than the cylindrical opening, to admit of its continuous revolving, without touching the surface of the cylindrical opening, slot the arbor diametrically to afford a port through its interior, and you have my improved valve.

The chief novelty of this invention lies in the fact that I provide for maintaining at all times a clearance between the valve and what is usually termed the valve seat, making in fact a seatless valve.

I make no attempt at balancing, or counterbalancing the valve; on the contrary, I provide for suspending the valve and allowing it to receive the steam pressure as a load which it transfers to suitable bearings that are separate from that part of the valve through which the steam passes.

This valve supported in bearings that are entirely removed from that part of the valve through which the steam passes, and the influence of the heat of the steam-chest will not only run with the least possible frictional resistance, but inasmuch as there is absolutely no wear upon the surface, will endure for a practically indefinite time.

Another feature of this structure is its adaptability to such additions and changes as are necessary to afford a positive action variable cut-off, controllable by an ordinary fly-ball governor, thus determining at each stroke of the piston, the time and period of the flow of steam or other propelling power.

In the accompanying sheet of drawings, Figure 1. represents a side elevation of my improved seatless valve. Fig. 2 is a cross-section of the same, taken on line $w.—w.$ of Fig. 1. Fig. 3 is a side elevation of my improved controlling valve. Fig. 4 is a cross-section of the same, taken on line $x.—x.$ of Fig. 3. Fig. 5 is a longitudinal sectional view, taken on line $y.—y.$ of Fig. 6, illustrating my improved seatless valve and its controlling valve as applied in the steam chest, together with the parts embodying my improvements; and Fig. 6 is a cross-sectional view, taken on line $z.—z.$ of Fig. 5, showing the clearance between the seatless valve and the surrounding metal.

Like reference characters indicate like parts.

A designates the main steam valve, in the form of a straight cylindrical shaft, having a long concentric bore $a^1$ which terminates with a reduced concentric bore $a^2$ provided with a screw-threaded portion, as at $a^3$. Beyond the shoulder $a^4$, left by the bores $a^1$ and $a^2$, said valve A is longitudinally slotted through its walls, to provide inlets to register nearly opposite each other, as at $a^5$, $a^5$ in Fig. 2.

B designates the controlling-valve, in the form of a solid and straight cylindrical shaft, having a body portion $b^1$ and a reduced concentric stem portion at each end thereof, as $b^2$ and $b^3$, and said valve B is longitudinally slotted through its body portion to provide a port $b^4$ which extends from a point within each end of said body portion and of a length to correspond with the length of the inlets $a^5$, $a^5$ of the main valve A.

The body portion $b^1$ of the controlling-valve B is of a size to fit loosely within the bore $a^1$ of the main valve A, and when positioned therein its shoulder $b^5$ abuts the shoulder $a^4$ of said valve.

The valves A and B, as above described, are essentially designed for use in connection with the well-known "Corliss" type of engine cylinder, wherein the steam and exhaust valve chests are formed so as to provide suitable chambers to receive vibratory or rocking valves.

Referring to Fig. 6, $b^7$ indicates the bore of the valve-chamber, an opening being provided between the inner wall $c^7$ and the outer wall $c^8$ of the steam-chest, to allow the free delivery of steam from the chamber $c$ to the valve-chamber $c^2$. I make the arbor-valve A slightly smaller in diameter than the bore $b^7$, so as to insure a clearance-space $c^2$ between the outside surface of the valve and the inside surface of said bore $b^7$. At points where the valve passes outside of the steam-chamber $c$, I make use of an ordinary stuffing-box to prevent the escape of steam from the annular clearance-space $c^2$ about the valve.

On each side of the engine-cylinder C is made fast a bracket $d$, and on each bracket is secured a support $e$, which is provided with a journal bearing $e^1$, of a size to receive the end portions of the valve A. One end of the valve A is exteriorly screw-threaded, as at $a^6$, to engage thereby with a nut $f$, which abuts the outer face of the support $e$, and the opposite end of said valve A is slightly reduced in diameter, as at $a^7$ in Fig. 1, and on this reduced portion is made fast a bevel-gear $g$, which meshes with a driving bevel-gear $g^1$.

The controlling-valve B is held within the bore $a^1$ of the main valve A, by means of a sleeve $h$, which is made fast within said bore $a^1$ and having its inner end abutting the shoulder $b^6$ of said valve B. A bushing $i$ of suitable composition or anti-friction metal is made fast within the bore $a^2$ of the main valve A, and said valve is also provided with a similar bushing $i^1$ made fast within its sleeve $h$, and each bushing acts as a journal bearing for each stem $b^2$, $b^3$ of the controlling-valve B. A screw-threaded plug $j$ engages the threaded portion $a^3$ of the main valve A, to prevent leakage of steam from the controlling-valve B. The bushing $i^1$ is shorter than the sleeve $h$, in order to provide space for a packing $k$ to surround the stem $b^2$ of the controlling-valve B, and bolts $l$, $l$ secured in the end of the main valve A are provided with nuts $m$, $m$ to impinge against and force a flange bushing $n$ in contact with said packing, and thus form a stuffing-box to prevent leakage of steam from the controlling-valve B.

An arm $o$ made fast on the valve-stem $b^2$, has a rod-connection $p$ with an ordinary fly-ball governor, not shown, to cause the valve B to vibrate a few degrees, to regulate the amount of steam necessary to maintain a uniform speed of the engine.

The main valve A is designed to rotate continually in one direction, by means of the gears $g$, $g^1$, and the axis of the bearings $e^1$, $e^1$ is in perfect alinement with the axial center of said valve, consequently the clearance-space $c^2$ is maintained throughout the bore $b^7$ formed in the steam-chest and extending between the bearings $e^1$, $e^1$ of the supports $e$, $e$. In Fig. 6, I have shown this clearance-space $c^2$ very much exaggerated, in order to add force to the language used in explanation of the discovery I have made, upon which I base my belief that I have at least done much toward the solution of the valve problem.

All sliding valves need lubrication, and they all require the expenditure of considerable power to operate them. My aim is to save much of this power by making a practically frictionless valve, therefore I make use of, what I term, an arbor valve, as A, Fig. 1,—a construction that is perfectly cylindrical throughout its length, and having openings passing diametrically through it, to provide ports, as $a^5$, $a^5$ in Figs. 1 and 2, for the passage of steam or other motive force. I mount this valve A upon suitable bearings $e^1$, $e^1$ (Fig. 5) which are in perfect alinement with the cylindrical bore $b^7$ formed in the steam-chest, and provide means for imparting to said valve a continuous rotary motion, by the bevel-gears $g$, $g^1$.

To hold the valve A in suspension between supports that are separate from each other requires careful consideration. It must be remembered that the load upon the valve is intermittent and continually varying in force. At times it is balanced. Immediately thereafter there may be excessive pressure, amounting to a severe elastic blow. These conditions occur at each revolution of the valve and must be provided for, and yet there must be no appreciable yielding of the valve. Of course it will yield somewhat and I provide for this in the valve-chamber or clearance-space $c^2$. The valve A must be sufficiently large and stiff to withstand the pressure to which it is liable to be exposed without sufficient deflection to neutralize the clearance-space $c^2$. A yielding that will be sufficient to neutralize the clearance-space $c^2$ would be entirely inadmissible. When I speak of clearance, I mean a considerable space, not merely a running fit which is calculated to provide simply pressureless contact. My arbor valve is suspended at its ends, and when in revolving it passes over and closes the cylinder port, it receives a load which is equal to the difference in pressure of the steam in the steam-chest and the steam in the cylinder, underneath the valve, multiplied by the area of the cylinder-port. All steam-valves are subjected to this ever varying pressure; with the ordinary valve the effect is to increase the friction, by the wear upon the valve and its connections. With my arbor valve it is quite different, as the load is received by said valve and transferred to its bearings, which are entirely outside and removed from the heat of the steam and where the bearings can be kept in perfect order at all times, to perform their function with the least possible friction.

It will be remembered that the valve A never comes in contact with anything but the bearings $e^1$, $e^1$, at each end of said valve, and the packing in the stuffing-boxes. Hence, I plan for a working-clearance equaling in space about double the amount of the deflection of said valve. I have learned through practical demonstration that my arbor valve is practically tight with say, two and one-half one thousandths (2-1/2/1,000) of an inch clearance, and I design the valve so that it will withstand the blows or pressure to which it is liable to be subjected without deflecting more than one-half of this amount, hence the valve will never come in actual contact with the surrounding metal and is never seated.

I do not claim a rotating valve, or a rotating slide valve. I do not claim a rotary valve made to run with pressureless contact, but I do claim a seatless valve; a valve that has a clearance-space between its outside surface and the surface of the metal adjacent thereto under all conditions, thereby affording capacity of the valve to yieldingly support its load without coming in contact with the surrounding metal, for therein lies the solution of the valve question.

In the drawings I show my rotary valve A for use in connection with a vibratory controlling valve B, as applied to a high power reciprocating engine, but it will be understood that said valve A and its manner of mounting may be used independently of said valve B for application to the class of engines that requires to be driven at a very high rate of speed, be it either steam, gasolene, or other motive power. The space between the valve and the surrounding metal is exceedingly small, the area of the space is considerable for it comprehends a large percentage of the circumferential area of the valve; a fact that precludes any serious leakage. I term this member A an arbor valve.

I contemplate filing another application for patent in the United States Patent Office upon my design for a valve gearing adapted to the operation of the herein-described arbor valve, and which calls for an entirely different treatment than has heretofore been practiced.

What I claim and desire to secure by Letters-Patent, is,—

1. An arbor valve adapted to perform its service without contact with surrounding metal.

2. An arbor engine valve rotatable about its true axis of symmetry and free from metal contact between its points of suspension.

3. A revolving arbor passing through a suitable chamber in a steam cylinder or steam chest, said arbor mounted upon bearings at either side and separate from said cylinder or said chest, and said arbor provided with ports or openings to control the flow of the power medium.

4. A rotary arbor valve supported and running in bearings that are outside and independent of an engine-cylinder or its pressure-chamber, and therefore practically removed from the influence of the temperature of the propelling power, and convenient of access.

5. An arbor valve adapted to perform its service without contact with the bore of the valve chamber and without any packing other than that afforded by the power medium.

6. A rotary arbor valve journaled at each outer side of and beyond the pressure chamber of an engine and seatless throughout said chamber.

7. A rotary arbor valve adapted to control steam power to drive an engine and suspended at points outside of the pressure chamber and said valve surrounded by a minute clearance-space through said chamber to prevent leakage circumferentially, of the power medium.

8. A rotary arbor valve provided with one or more ports and having its ends suspended at points beyond each side of the pressure chamber of an engine, so constructed that said valve may have its full circumferential area of surface, between its suspended points, free from metal contact.

9. A rotary arbor valve having its ends journaled beyond each outer side of the pressure chamber of an engine and adapted to perform its service without metal contact.

10. A rotary arbor valve adapted to control the power medium to drive an engine and having its ends journaled at a distance from the power medium and said valve surrounded by a clearance-space to insure at all times a thin film of steam, gas, or other power medium between the surface of said valve and its bore or chamber.

11. A seatless valve having its ends journaled at a distance from the power medium to drive an engine and designed to rotate in a suitable chamber so proportioned as to leave a minute clearance-space of large area between the surface of said valve and the adjacent metal of the pressure chamber and thereby render said valve frictionless and avoiding leakage of the power medium.

12. A rotary arbor valve adapted to receive the power medium of an engine, having its ends mounted in bearings which are at a distance from the power medium, and said valve surrounded at all times by a clearance-space.

13. An arbor valve in the form of a straight cylindrical shaft adapted to rotate and control the power medium in the chest or chamber of an engine and having its ends mounted in bearings which are at a distance from the chest or chamber, and said valve surrounded by a clearance-space formed in the chest or chamber.

14. A seatless rotary valve adapted to control the power medium to drive an engine and mounted in bearings which are at a distance from the power medium.

15. A seatless valve, so constructed and operated as to insure a minute intermediate space of large area, between the surface of said valve and the adjacent material, thereby rendering it frictionless in its operation and practically proof against leakage.

16. In combination with a vibratory valve for controlling the propelling medium of an engine, of a tubular arbor valve loosely mounted on the first mentioned valve and having its ends journaled in bearings which are at a distance from the propelling power, and said arbor valve surrounded by a clearance-space communicating with the propelling power.

17. An engine valve supported by bearings located outside of the cylinder or pressure chamber, said valve designed to move parallel to its seat without touching it, thereby maintaining at all times a film of the propelling medium between the two surfaces, to prevent leakage and avoid friction.

18. An arbor engine-valve designed to rotate within a film of steam or other motive fluid and the bearings for said valve being entirely disconnected from the pressure chamber.

19. A rotary arbor engine-valve having its friction relieved by a clearance-space and the bearings supporting said valve being outside of the valve-chamber and disconnected therefrom.

20. A cylindrical arbor engine-valve of lesser diameter than the bore of the valve-chamber in order to provide a clearance-space for the steam or other power medium to surround said valve and thereby eliminate the friction and said valve adapted to rotate in bearings which are separate from and outside of the valve-chamber.

21. A seatless valve having its ends journaled in bearings which are at a distance from the power to drive an engine and designed to rotate continuously in one direction.

22. In combination with a vibratory valve for controlling the power of an engine, of a tubular arbor valve loosely mounted on the first mentioned valve and having its ends mounted in bearings which are at a distance from the propelling medium, said arbor valve surrounded by a clearance-space communicating with the prepelling medium, and both said valves designed to rotate about their true axis of symmetry.

23. In combination with a vibratory valve for controlling the propelling power to drive an engine, of a tubular seatless valve inclosing the first mentioned valve and having its ends mounted in bearings which are at a distance from the propelling medium, and said seatless valve adapted to rotate continuously in one direction.

24. In combination with a vibrating valve adapted to control the power medium to drive an engine, of an arbor valve in the form of a straight cylindrical shaft loosely inclosing the first mentioned valve and having its ends mounted in bearings which are at a distance from the power medium, a clearance-space surrounding the last mentioned valve and communicating with the power medium, and means to rotate the last mentioned valve.

25. In combination with the chest or chamber for containing the propelling medium to drive an engine and said chest or chamber provided with a straight valve-bore therethrough, of an arbor valve in the form of a straight cylindrical shaft of slightly lesser diameter than said valve-bore and journaled in bearings which are at a distance from the chest or chamber, and said valve designed to rotate continuously in one direction.

26. In combination, the herein-described engine-valve structure, consisting of a main-valve in the form of a straight cylindrical tubular shaft having ports extending lengthwise in its walls and said valve having a concentrically arranged journal bearing within each end portion; supports secured on the engine-cylinder; brackets secured on each support and each bracket provided with a journal bearing to receive the end portions of said valve; a clearance-space surrounding said valve throughout the valve-bore formed in the engine-chest; a bevel-gear made fast on one end of said valve; a second bevel-gear in mesh with and adapted to drive the first mentioned bevel-gear; a controlling-valve in the form of a straight and solid cylindrical shaft having a body-portion of a size to loosely fit within the first mentioned valve, said controlling-valve having a reduced concentric stem projecting from each end of its body-portion to rest in the bearings of the first mentioned valve, and said controlling-valve having its port extending lengthwise of its body-portion to register with the ports of the first mentioned valve; an arm having one end made fast on one stem of said controlling-valve, and a rod-connection from the free end of said arm to impart a vibratory motion to said controlling-valve.

In testimony that I claim the foregoing as my invention, I have hereunto signed my name this first day of April 1909.

WILLIAM CORLISS.

In the presence of—
FRANKLIN A. SMITH,
D. F. SHERMAN.